UNITED STATES PATENT OFFICE.

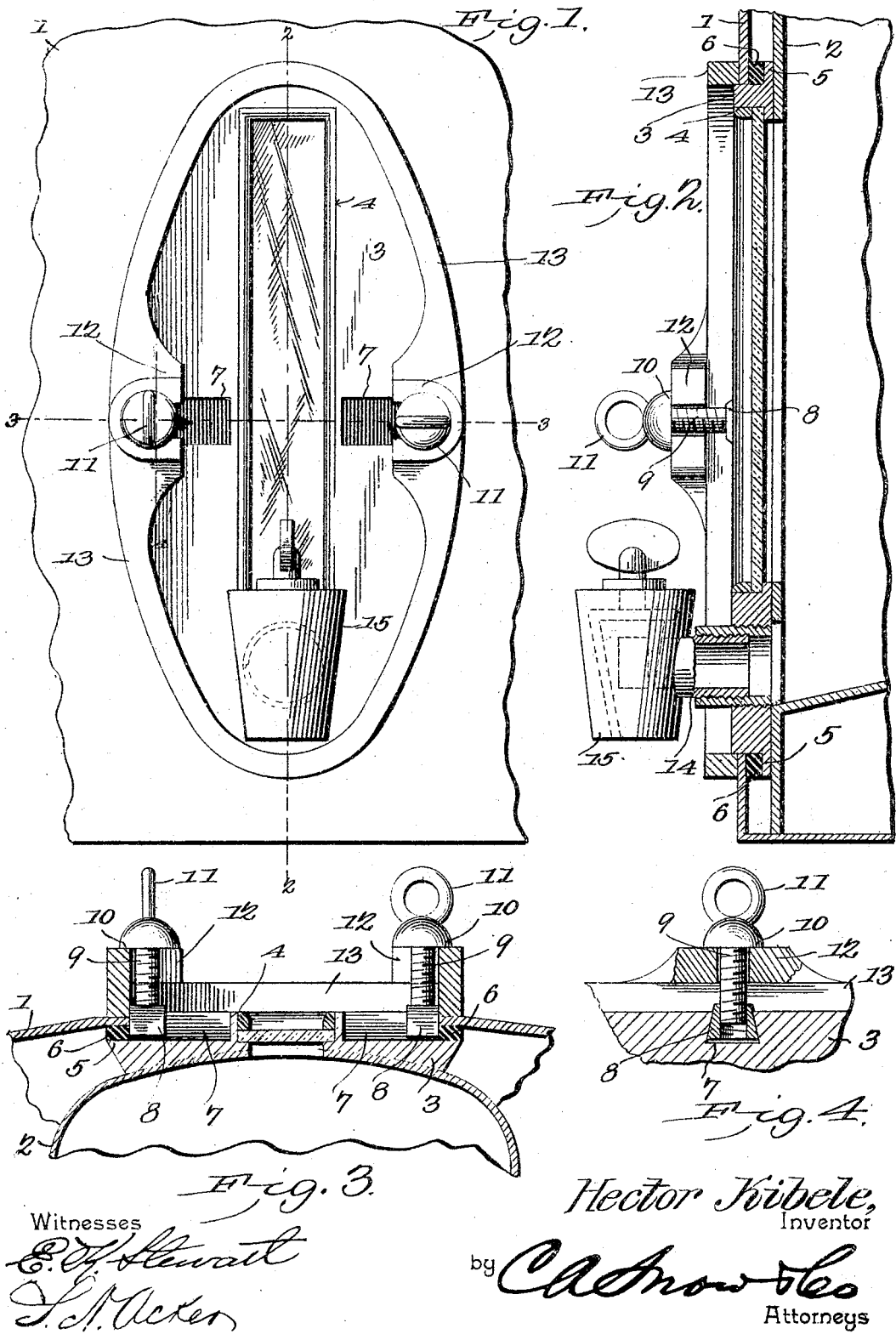

HECTOR KIBELE, OF BLUFFTON, OHIO, ASSIGNOR TO FAVORITE MANUFACTURING CO., OF BLUFFTON, OHIO.

CREAM-SEPARATOR.

No. 798,107.　　　Specification of Letters Patent.　　　Patented Aug. 29, 1905.

Application filed June 17, 1904. Serial No. 213,040.

*To all whom it may concern:*

Be it known that I, HECTOR KIBELE, a citizen of the United States, residing at Bluffton, in the county of Allen and State of Ohio, have invented a new and useful Cream-Separator Attachment, of which the following is a specification.

This invention relates generally to cream-separators such as consist usually of an outer cylindrical receptacle intended to contain water or any other suitable cooling medium and an inner elliptical receptacle intended to receive milk from which the cream is to be separated, the inner receptacle being elliptical in shape, so that no part of the milk contained therein may be separated widely from the chilled surface of the receptacle, whereby the separation of the cream is expedited.

The invention relates particularly to the gage attachments or bodies which not only permit the inspection of the milk and cream in the inner receptacle, but also serve as the means of removably securing the inner receptacle within the outer receptacle.

One object of the present invention is to improve the shape of the gage-body in such manner that it may be secured firmly to the elliptical receptacle and may form a close joint with the outer receptacle, so as to prevent leakage of the cooling medium.

A further object of the invention is to improve and simplify the means for securing the gage-body to the frame which rests against the outer receptacle.

With these objects in view the invention resides in an elliptical gage-body secured to one end of the elliptical receptacle and having undercut grooves, an elliptical frame cooperating with the gage-body, nuts in the undercut grooves, and screws in the nuts for securing the frame and body together.

The invention also resides in the particular combination and arrangement of parts and in the details of construction hereinafter described and claimed.

In the accompanying drawings, forming part of this specification, Figure 1 is a front elevation of a portion of a cream-separator, showing a gage-body constructed in accordance with my invention applied thereto. Fig. 2 is a longitudinal sectional view taken on the line 2 2 of Fig. 1. Fig. 3 is a transverse sectional view taken on the line 3 3 of Fig. 1, and Fig. 4 is a detail sectional view showing the construction of the clamping-screw and nut.

Like reference characters indicate corresponding parts in the different views.

The numeral 1 indicates the outer receptacle, which is intended to receive water or any other cooling medium. Within the receptacle 1 is the receptacle 2, which preferably is elliptical in shape and is intended to receive milk from which cream is to be separated. One end of the receptacle 2 is cut away to form a sight-opening, around which is secured in any suitable manner an elliptical gage-body 3, having therein a slot 4, in which is seated a plate of glass or other transparent material. The rear side of the gage-body is shaped in such manner as to conform to the end of the elliptical receptacle 2. A flange 5 is formed around the gage-body 3 to receive an elliptical gasket 6, which bears against the inner surface of the receptacle 1 around the edge of an elliptical opening formed therein. The gage-body 3 is formed with undercut slots or grooves 7 7, which are open at their outer ends.

In each of the open-ended grooves 7 7 is situated a nut 8, which is shaped in such manner that it can be moved longitudinally in the undercut groove, but cannot be withdrawn therefrom except by passing it out through the open end thereof.

Fitting into a threaded bore in each of the sliding nuts 8 is a turn-screw 9, formed with a shoulder 10 and a ring or finger portion 11. When the turn-screw 9 is screwed down into the nut 8, it forces the latter in contact with the side walls of the grooves, thereby preventing any longitudinal movement of the nut in said grooves. The shoulder 10 on each screw 9 engages a slotted lug 12 on an elliptical frame 13, which is disposed against the outer surface of the receptacle 1 around the elliptical opening therein. When the turn-screws 9 are tightened, the elliptical frame 13 is drawn against the outside of the receptacle 1 and the gage-body 3 against the inside thereof, the elliptical gasket 6 being compressed to prevent the leakage of water from the receptacle 1. When it is desired to remove the inner receptacle 2 for cleaning purposes, the screws 9 are loosened and the nuts 8 are moved longitudinally in their undercut slots until the shoulders 10 of the screws become disengaged from the slotted lugs 12 on the elliptical frame.

Fitted into an opening in the gage-body 3 is a brass bushing 14, which is screw-threaded interiorly to receive a brass faucet 15. This construction presents an improvement over prior devices in which no bushing is employed, the faucet being fastened merely into the white metal of the gage-body. In such prior devices the faucet soon corrodes, and therefore cannot be removed from the gage-body for cleaning purposes.

The essence of the invention resides in the fact that the gage-body, frame, and gasket are elliptical, whereby the gage-body is secured firmly to the end of the elliptical receptacle and a much more satisfactory and a tighter joint is produced between the gage-body and the outer receptacle than is possible with the approximately rectangular or round gage-bodies of prior devices.

An improvement over the prior art is also presented by the gage-body having sliding attaching means comprising undercut grooves, a nut movable longitudinally in each groove and conforming to the shape thereof, a screw engaging each nut, and a frame having slotted lugs adapted to be engaged by the screws.

Changes in the precise embodiment of invention illustrated and described may be made within the scope of the following claims without departing from the spirit of the invention or sacrificing any of its advantages.

Having thus described the construction and operation of my invention, what I claim as new, and desire to secure by Letters Patent, is—

1. A cream-separator comprising an outer receptacle having an opening, an inner receptacle also provided with an opening, a gage-body surrounding the opening in the inner receptacle and provided with undercut grooves, a nut in each groove conforming to the shape thereof and movable longitudinally therein, a screw engaging each nut, and a frame surrounding the opening in the outer receptacle and having slotted lugs adapted to engage said screws.

2. A cream-separator comprising an outer receptacle having an opening, an inner receptacle also provided with an opening, a gage-body surrounding the opening in the inner receptacle and provided with alined transversely-disposed undercut grooves, nuts slidably mounted in said grooves and conforming to the shape thereof, screws threaded in the nuts, and a frame surrounding the opening in the outer receptacle and having slotted lugs, the slots of which communicate with the interior of the frame and engage said screws.

In testimony that I claim the foregoing as my own I have hereto affixed my signature in the presence of two witnesses.

HECTOR KIBELE.

Witnesses:
A. L. BAUMGARTNER,
A. M. DIXEL.